United States Patent [19]

Winkler et al.

[11] Patent Number: 4,716,647
[45] Date of Patent: Jan. 5, 1988

[54] MACHINE TOOL

[75] Inventors: Hans-Henning Winkler, Tuttlingen; Eugen Rütschle, Mühlheim, both of Fed. Rep. of Germany

[73] Assignee: Chiron-Werke GmbH, Tuttlingen, Fed. Rep. of Germany

[21] Appl. No.: 906,315

[22] Filed: Sep. 11, 1986

[30] Foreign Application Priority Data

Sep. 17, 1985 [DE] Fed. Rep. of Germany ....... 3533088
Jun. 18, 1986 [DE] Fed. Rep. of Germany ....... 3620343

[51] Int. Cl.⁴ ............................................. B23Q 3/157
[52] U.S. Cl. ........................................ 29/568; 901/37
[58] Field of Search .................... 29/568, 26 A, 27 C, 29/563, 564; 901/22, 37, 41, 29; 414/758, 763, 783, 223; 408/60

[56] References Cited

U.S. PATENT DOCUMENTS

| | | | |
|---|---|---|---|
| 4,090,287 | 5/1978 | Selander | 29/568 |
| 4,359,815 | 11/1982 | Toyoda | 29/568 |
| 4,370,091 | 1/1983 | Gagliardi | 901/29 |
| 4,457,659 | 7/1984 | Watanabe | 414/223 |
| 4,489,629 | 12/1984 | D'Andrea et al. | 29/568 X |
| 4,505,636 | 3/1985 | Sugino et al. | 901/37 |
| 4,534,803 | 8/1985 | Asano et al. | 408/60 X |
| 4,555,844 | 12/1985 | Palfery et al. | 29/568 |
| 4,557,035 | 12/1985 | Rütschle et al. | 29/568 |
| 4,571,814 | 2/1986 | Palfery et al. | 29/568 |
| 4,636,135 | 1/1987 | Bancon | 901/37 X |
| 4,683,638 | 8/1987 | Winkler et al. | 29/568 |

FOREIGN PATENT DOCUMENTS

| | | | |
|---|---|---|---|
| 0088644 | 3/1983 | European Pat. Off. | 29/568 |
| 120275 | 10/1984 | European Pat. Off. | 29/568 |
| 2820165 | 6/1981 | Fed. Rep. of Germany. | |
| 2852846 | 3/1985 | Fed. Rep. of Germany. | |
| 841961 | 7/1981 | U.S.S.R. | 901/37 |

*Primary Examiner*—William R. Briggs
*Attorney, Agent, or Firm*—Walter A. Hackler

[57] ABSTRACT

A machine tool comprises a spindle stock (11) that can be moved about several axes relative to a work plate. Tools can be transferred, preferably by means of gripper arms, from a magazine position in the tool magazine into a working position in a tool carrier of the spindle stock (11), or vice versa. At least one of the tools is designed as a handling element. The working space of the spindle stock is provided with at least one work magazine for accommodating workpieces.

In order to be able to machine the workpieces in various ways, in particular along several axes, the handling element is designed as a gripper element (29) and provided with externally operated clamping jaws (66) for gripping one or more workpieces (30) contained in the work magazine and transferring them into a machining station designed for holding and/or positioning a workpiece during or for machining of the workpiece (30). The tool carrier of the spindle stock (11) comprises a connection element (53, 62) for supplying energy for operating the clamping jaws (66).

15 Claims, 7 Drawing Figures

MACHINE TOOL

The present invention relates to a machine tool comprising a spindle stock that can be moved about several axes relative to a work plate, a tool magazine and at least one gripper arm for transferring tools from one magazine position in the tool magazine into a working position in a tool carrier of the spindle stock, or vice versa, at least one of the tools being designed as a handling element and the working space of the spindle stock being provided with at least one work magazine for accommodating workpieces.

A machine tool of this type has been known already from German Patent Specification No. 28 52 846.

The known machine tool comprises a spindle rotatable about a horizontal axis, and a tool magazine mounted above the said spindle and arranged to revolve about a vertical axis in the manner of a turret. A two-armed gripper can be rotated about an axis extending parallel to the spindle axis, above the spindle, for withdrawing tools from the tool magazine and positioning them in a tool carrier of the spindle stock, or vice versa. In front of the spindle stock, there is provided a table that can be displaced along a horizontal axis, vertically to the spindle axis, and on which one or more workpiece pallets are provided. The workpieces are processed by means of a tool clamped in the spindle while they are positioned in the workpiece pallet.

In order to permit a workpiece pallet with completely processed workpieces to be exchanged against a new workpiece pallet containing workpieces that are still to be processed, it is provided in the case of the known machine tool that a pallet gripper can be changed in instead of a usual machining tool. The pallet gripper can be positioned in the tool carrier of the spindle just as any other tool and carries on its forward hand a hook-like structure. The shape of the hook-like structure matches that of a corresponding counterpart on the workpiece pallet. The pallet gripper mounted in the spindle can then be used to displace the workpiece pallet containing the machined workpieces from its holder on the transversely moving table to a platform provided behind the workpiece pallet, viewed from the spindle along a line forming the extension of the spindle axis. Analogously, the workpiece pallet containing the workpieces which are still to be machined, can be drawn by the same pallet gripper from the said platform onto the movable table and towards the spindle.

A similar machine tool has been known before from U.S. Pat. No. 4,090,287.

This known machine also comprises a spindle with horizontal axis in which a transfer rod, provided with a hook on its forward end, can be fitted instead of the usual tools. Here, too, the transfer rod serves to displace workpiece pallets, which are provided with a corresponding counter-part, in the direction of the spindle axis from a supply platform to a working platform, or vice versa.

In both described cases of machine tools, the pallet gripper and the pallet are merely brought into form-locking engagement, and this is absolutely sufficient because it is only necessary to displace the workpiece pallets in the direction of the spindle axis.

Accordingly, it only possible with the two known machine tools to machine a plurality of workpieces arranged on the pallets in fixed position. However, in certain applications, this restricts the degrees of freedom of the machining operations quite considerably because workpieces which are tightly packed in a workpiece pallet are of course not accessible with the equal ease from all sides so that, generally, machining operations carried out on workpieces loaded on such pallets can be carried out only from one direction. However, this restriction is in conflict with the actual object of machine tools of this type, which are usually described also as "machining centers", because it is of course the purpose and objective of the plurality of tools that can be changed in in such machining centers to machine the workpiece as completely as possible, i.e. to carry out all the machining steps required with only a single mounting operation. By striving for this aim one intends not only to reduce the machining time as a whole, but also to increase the machining accuracy because a workpiece which remains unchanged in the position in which it has been mounted originally, can of course be machined with greater accuracy than a workpiece which has to be mounted anew several times.

Now, it is the object of the present invention to improve a machine tool of the type described above in such a manner that while maintaining minimum set-up times, a considerably greater number of different processing steps can be carried out on the workpiece in a single pass.

According to the invention, this object is achieved by an arrangement in which the handling element is designed as a gripper element and provided with externally operated clamping jaws for gripping one or more workpieces contained in the work magazine and transferring them into a machining station designed for holding and/or positioning a workpiece during or for machining thereof by means of a tool, the tool carrier of the spindle stock comprising a connection element for supplying energy for operating the clamping jaws.

The object underlying the invention is achieved in this manner completely and perfectly because according to the invention only a single or at best a small number of workpieces is fed at a time into the machining position where it is easily accessible for the tool of the machine tool for machining operations of the most different types.

If the workpiece is fed, for example, to a dividing attachment, it can be rotated about one or more axes and machining operations can be carried out along different axes in a single mounting position. Compared with the hooks of the pallet grippers known from the prior art with their unvariable design, the externally-operated clamping jaws of the gripper elements provide the advantage that workpieces of the most different types can be gripped and handled without the need to make special constructional arrangements on the workpieces.

Due to the fact that the workpieces are transferred from the magazine to the machining stations either individually or in groups of several workpieces, minimum set-up times are obtained because the workpiece is completely machined without the user of the machine tool having to interfere. In many cases this makes up by far the gain in time achieved when a plurality of workpieces are machined arranged in pallets because in cases where workpieces arranged in pallets according to the prior art are to be machined along several axes, they have to be mounted anew for every machining operation while the machine tool according to the invention permits even the most complex workpieces to be machined completely in single pass.

According to a preferred embodiment of the invention, the tools and the gripper element are provided with a standard outer taper while the end of the spindle stock is provided with a standard inner taper.

This measure provides the considerable advantage that the machine tool according to the invention can be designed in the conventional manner because due to the use of standard tapers the gripper element can be designed in the same manner as the usual tools so that only minor modifications, if any, may be required on the machine tool.

According to another preferred embodiment of the invention, the tool magazine is arranged at the spindle stock, and there are provided at least two gripper arms for withdrawing a tool or the gripper element from the tool magazine and positioning it in the tool carrier of the spindle stock, or vice versa, in push-pull operation.

This feature provides the considerable advantage that short machining times are rendered possible by the fact that after transfer of the workpiece into the machining position and unloading of the gripper element from the spindle stock, a tool can be positioned in the spindle stock immediately without having to return the gripper element to the magazine first. In this manner, another notable reduction of the machining times is achieved.

It is particularly preferred in the embodiment of the invention just described to give the tool magazine the shape of a horseshoe and to arrange it in a plane extending perpendicularly to the vertical axis of the spindle stock and around the latter.

This measure provides the advantage that a very large number of tools and, if required, also of gripper elements can be arranged in a single magazine which is located in the direct neighborhood of the spindle stock so that the short transfer paths between the magazine and the tool carrier of the spindle stock provide a further reduction of the set-up times.

According to another embodiment of the invention, the tool magazine is arranged at a distance from the spindle stock, and the tools or gripper elements are picked up by displacing the spindle stock.

This feature is of particular advantage in cases where special tools or special gripper elements are to be used according to the invention which, due to their large dimensions, cannot be accommodated in a usual tool magazine. This may be the case, in particular, if multiple tools or multiple gripper elements are to be used according to the invention for machining and/or gripping simultaneously a plurality of workpieces.

Another embodiment of the invention is characterized in that the connection element connects a pressure fluid line provided in the spindle stock with the fluid-operated drive of the gripper element when the gripper element is clamped in the spindle stock.

Still another embodiment of the invention is characterized in that a pressure fluid line is provided on the spindle stock and connected via a connection element with a fluid-operated drive of the gripper element when the gripper element is clamped in the tool carrier.

This feature provides the advantage that the gripper element can be operated by external energy supply and that the pressure fluid line, in particular a compressed-air line, can be connected without any problems by causing the necessary connection element to close automatically when the gripper element is clamped.

According to a variant of this embodiment of the invention, the pressure fluid line is arranged at the periphery of the spindle stock.

This feature provides the advantage that existing machine tools can be adapted easily since it is only necessary to run a pressure fluid line along the outside of the spindle stock and down into the area of the tool carrier of the spindle stock.

According to another variant of this embodiment of the invention, the pressure fluid line is arranged along the rotary axis of the spindle stock.

This measure requires of course some more constructional changes of the machine tool, however it opens up the very favorable possibility to rotate the gripper element, in particular through the spindle motor, so that the workpiece held by the gripper element can be rotated at desire about the rotary axis of the spindle during its transfer from the magazine to the processing station.

Finally, it is provided in one embodiment of the invention to connect a pressure sensor to the pressure fluid line.

This feature provides the advantage that it permits to detect, in a very simple manner and without any additional position sensors, if the gripper element has actually gripped a workpiece because it can be assumed that the gripper element is closed when pressure fluid is supplied through the pressure fluid line.

According to still another embodiment of the invention, a stepping control is provided for controlling a spindle motor in such a manner that the spindle rotates the gripper element, when the latter is mounted, by a pre-determined angular step. Such angular rotation may be about the rotary axis of the spindle or about an axis extending perpendicularly thereto.

This feature provides the advantage that expensive dividing attachments can be dispensed with when only simple turning operation have to be carried out. This possibility is provided, for example, when the processing station is provided with chucking means with two clamping jaws for receiving the workpiece and holding it during the machining operation, and when the workpiece has to be turned only by 90° or 180° about one axis of coordinates in order to permit the next operation to be carried out. The rotation can of course be carried out also in several steps, between which the workpiece is held by the chucking means, for example for turning the workpiece upside down. However, it goes without saying, that other defined angular steps of, say, 45°, 60° or the like can also be carried out in this manner.

According to a variant of this embodiment of the invention, the spindle stock is provided with coupling means to permit the angular movement to be carried out selectively either about the rotary axis or about the axis extending perpendicularly thereto.

This feature provides the advantage that the driving power necessary for rotating the gripping element can be derived from the spindle motor regardless of the axis about which the rotation is to be effected. It is then possible to provide a coupling acting radially and another coupling acting axially so that use can be made of the rotary movement of the spindle either about the same axis or about an axis extending perpendicularly thereto. It goes, however, without saying that the rotary movement of the gripper element can be effected and/or controlled also by the external power which is anyway supplied to the gripping element for actuating the clamping jaws.

According to another embodiment of the invention, the clamping jaws are provided with a profile adapted to the workpiece to be gripped.

This feature provides the advantage that the frictional engagement of the workpiece by the externally operated clamping jaws can be supplemented by a form-locking engagement so that, for example, very heavy workpieces can be lifted, the lifting force being limited only by the axial holding force of the spindle which is usually very high.

According to a further embodiment of the invention, the actuating force of the clamping jaws is adjustable, preferably continuously adjustable.

This feature provides the advantage that the holding force of the clamping jaws can be adapted to the material and the surface properties of the workpiece to be processed. If, for example, a workpiece has a finely machined surface, the actuating force of the clamping jaws can be adjusted to a very low value so that any damage to the surface is safely avoided.

According to certain embodiments of the invention, a gripper tool is provided with a plurality of gripper elements. The clamping jaws of the said plurality of gripper elements can, preferably, be actuated separately.

This feature provides the advantage that a certain number of workpieces, for example 4 or 6 workpieces, can be gripped simultaneously and handled in the manner described above. In the case of workpieces differing from each other, it is then possible, due to the fact that the clamping jaws of the individual gripper elements can be adjusted individually, to set different operating forces or to effect different rotary movements of the individual workpieces.

Finally, a particularly favorable effect is achieved according to the invention when the spindle stock is arranged beside a work table that can be rotated about an axis extending parallel to the spindle axis in such a manner that when the work table is rotated by, preferably, 180°, one half of the work table is located in the working area of the spindle stock, and when one half of the table carries a workpiece magazine, while the other half carries the processing station.

This feature provides the advantage that the workpiece magazine is "moved up" to the spindle stock, without the need to displace the latter a long way, so that the gripper element can initially remove a completely processed workpiece from the processing station and then, after rotation of the work table by, for example, 180°, load the workpiece so removed into the work magazine. When this procedure is employed, the work magazine is arranged far outside of the working area of the spindle so that the work magazine with the partly processed and partly not yet processed workpieces contained therein, cannot be soiled by splashing drilling coolant or chips flying around. This provides the advantage that the gripper elements always pick up clean workpieces when exchanging the latter, so that there is no risk that a metal chip sticking to the workpiece may prevent the workpiece from being gripped or may damage the clamping jaws of the gripper element.

Other advantages of the invention will become apparent from the following specification and the attached drawing.

It is understood that the features that have been explained above and which will be described hereafter can be used not only in the stated combinations, but also in other combinations or individually, without leaving the scope of the present invention.

Certain embodiments of the invention will be described hereafter in detail with reference to the drawing in which.

Figure 1:
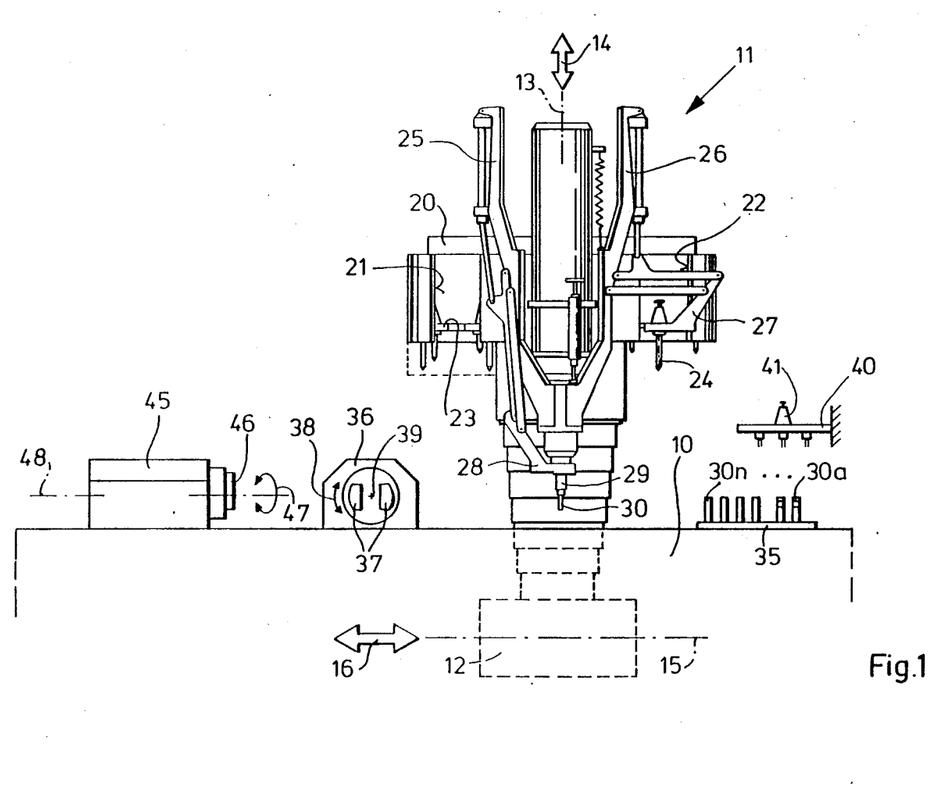
FIG. 1 shows a diagrammatic overall view of one embodiment of a machine tool according to the invention.

In FIG. 1, the table of a machine tool is designated by reference numeral 10. The machine tool comprises a spindle stock 11 which can be displaced, by means of a drive 12 which is indicated in the drawing very diagrammatically, along a vertical axis 13 in the direction indicated by double arrow 14, along a longitudinal axis 15 in the direction indicated by double arrow 16, and along an axis extending perpendicularly to the axes 13 and 15.

A magazine 20 of horseshoe shape is arranged about the spindle stock 11. In the front view shown in FIG. 1, the two forward ends of the said magazine can be seen on both sides of the spindle stock 11. The magazine 20 is provided with openings 21, 22 in the area of these ends. In the left opening 21, a part of an endless conveyor belt 23 can be seen by means of which tools 24 can be fed along a double horseshoe-shaped track in the magazine 20 so that the tools can be made available, by proper selection of the openings 21, 22, for being picked up from or re-loaded into the magazine 20. A left gripper arm 25 and a right gripper arm 26 are arranged on the spindle stock 11 in such a manner that the spindle stock 11, the magazine 20 and the gripper arms 25, 26 can all be displaced by the drive 12. One thus obtains a variable tool-changing plane which helps reduce the necessary re-tooling times.

It can be clearly seen in FIG. 1 that the right gripper arm 26 is in the magazine position in which it has just withdrawn a tool 24 from the magazine 20 by its free end 27, or just about to re-load the tool into the magazine.

In contrast, the left gripper arm 25 is shown in its operating position in which it holds a gripper element 29, which will be described hereafter in greater detail with reference to FIG. 2, in a tool carrier of the spindle stock 11. At the lower end of the gripper element 29, a workpiece 30 can be seen.

Except for the gripper element 29 and the workpiece 30, all details of the spindle stock, including the before-described individual units, have been described already in applicant's prior U.S. patent application Ser. No. 872,696, the disclosure of which is herewith incorporated in the present application by reference.

It can be further seen in FIG. 1 that a pallet 35 with workpieces 30a . . . 30n is arranged on the right side of the table 10. On the left side of the spindle stock 11, there can be seen a first dividing attachment 36 with a jaw chuck 37 that can be rotated in the direction indicated by arrow 38 about an axis 39 extending perpendicularly to the drawing plane.

On the left side of the said first dividing attachment 36, a second dividing attachment 45 with a jaw chuck 46 can be seen which can be rotated in the direction of arrow 47 about an axis 48 extending in parallel to the longitudinal axis 15.

It is of course possible to provide additional dividing attachments or other holding means for the workpieces 30a . . . 30n in other positions.

Reference numeral 40 in FIG. 1 finally designates an external tool magazine arranged at a distance from the displaceable spindle stock 11 in a position which is, preferably, fixed in space. The external tool magazine 40 serves for receiving special, in particular bulky, tools or gripper elements which cannot be accommodated in the tool magazine 20 due to their big dimensions. This applies in particular to multiple tools or multiple gripper tools permitting a plurality of workpieces to be processed and/or picked up simultaneously.

For changing in such a tool 41 in so-called "pick up" operation, the tool or gripper element used last is first transferred back into the tool magazine 20 by means of one of the gripper arms 25 or 26 and a special program control. The gripper arms 25, 26 then move into their magazine position, and the spindle stock 11 is displaced until it reaches a position in the area of the external tool magazine 40 in which the bulky tool 41 can be picked up directly by the tool carrier of the spindle. Upon completion of the processing or gripping process, the bulky tool 41 is re-loaded into the external tool magazine 40 in the same manner, whereafter the next tool 24 or gripper element 29 can be picked up in the magazine 20 by one of the gripper arms 25 or 26 and loaded into the tool carrier of the spindle.

The operation of the machine tool shown in FIG. 1 is as follows:

At the moment the machine tool is switched on, both gripper arms 25, 26 are in their magazine positions, the pallet 35 contains workpieces 30a . . . 30n that are to be machined, and the dividing attachments 36, 45 are empty.

Now, the conveyor belt 23 is moved until the gripper element 29 appears at one of the openings 21, 22 where it is picked up by the gripper arm 25 or 26 on the respective side. The gripper arm 25 or 26 then moves to the operating position and positions the gripper element 29 in the tool carrier of the spindle stock 11. The spindle stock 11 is now displaced in a manner to permit the gripper element 29 to pick up one of the workpieces 30a . . . 30n in the pallet 35, and once the workpiece 30 has been picked up, it is transferred to one of the dividing attachments 36 or 45, depending on what machining operations are to be carried out.

During the before-described operations, the other gripper arm 25 has picked up the tool 24 required first from one of the openings 21 or 22 of the magazine, and is now waiting ready in the magazine position. As soon as the workpiece 30 has been positioned in one of the jaw chucks 37 or 46 by means of the gripper element 29, the latter is removed from the tool carrier of the spindle stock 11 and replaced by the tool 24, by oppositely directed movements of the gripper arms 25, 26.

Thereafter, all the desired tools 24 are changed in one after the other in the same manner until all machining operations have been carried out on the workpiece 30.

It is understood that during these operations, the dividing attachment 36 or 45 used at any time may perform rotary movements of the workpiece 30, for example to permit inclined bores, chamfers or the like to be machined.

Now, if the tool 30 is to be changed, the gripper element 29 is once more changed in by means of the gripper arms 25, 26, and the workpiece 30 can either be transferred by one dividing attachment 36 to the other dividing attachment 45, or be returned to the pallet 35.

The before-described processes are now repeated cyclically until all workpieces 30a . . . 30n have been machined completely.

Figure 2:
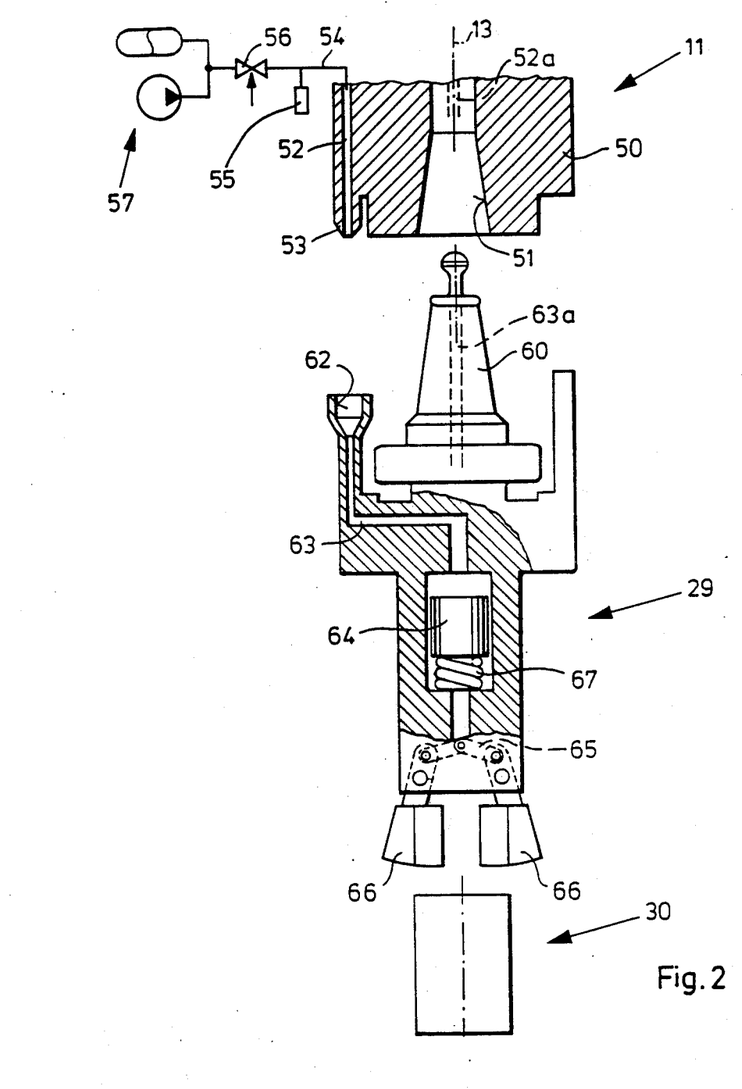
FIG. 2 is a greatly enlarged representation of a gripper element suited for use in a spindle stock or machine tool according to the invention.

FIG. 2 shows a greatly enlarged representation, in the form of an exploded view, of the details of the gripper element 29, related to the tool carrier of the spindle stock 11.

In FIG. 2, reference numeral 50 designates the lower end of the spindle stock 11 provided with an inner taper 51, in particular a standard inner taper.

According to one embodiment of the invention, a compressed-air bore 52 ending at the bottom in a first part 53 of a plug-and-socket connection is provided on the periphery of the spindle stock 11. The compressed-air bore 52 is connected to a line 54 leading on the one hand to a pressure sensor 55 and, on the other hand, to a pressure supply unit 57, via a switching valve 56.

The upper end of the gripper element 29 is formed by an outer taper 60 matching the inner taper 51 of the spindle stock 11. Preferably, the outer taper 60 is a DIN taper of the type usual with tools employed in machine tools.

At the upper end of the gripper element 29, one further sees a second part 62 of a plug-and-socket connection which coacts with the first connection part 53 on the spindle stock 11 when the gripper element 29 is mounted.

A channel 63 leads from the second connection part 62 to a piston/cylinder unit 64 which operates, for example via a toggle linkage 65, clamping jaws 66 by which the workpiece 30 can be gripped safely.

According to a variant of the embodiment shown in FIG. 2, the compressed-air supply, instead of being arranged on the periphery of the spindle stock 11 or the gripper element 29, is ensured by corresponding lines arranged along the rotary axis, i.e. the vertical axis 13 of the spindle stock 11, as indicated at 52a in the area of the spindle stock 11 and at 63a in the area of the gripper element 29.

The difference between these two embodiments is to be seen in the fact that when the compressed-air supply is arranged on the periphery, only the clamping jaws 66 can be actuated, while the gripper element 29 has to be fixed against rotation in the operating position. If, however, the compressed-air supply is arranged along the rotary axis of the spindle stock, the gripper element 29 can be rotated in the mounted condition, for example by means of the spindle motor anyway provided. This permits the workpiece 30 gripped by the clamping jaws 66 to be rotated at a speed that can be pre-set. Considering that the drive of the spindle stock can set exactly any given angular position, it is possible also to give the workpiece 30 any desired defined position.

Now, when the gripper element 29 according to FIG. 2 is clamped in the tool carrier of the spindle stock 11, the connection parts 53, 62 are joined operatively so that a pressure agent, in particular compressed air, can be supplied to the lines 52, 63 via the switching element 56. This causes the piston/cylinder unit 64 to be actuated and the clamping jaws 66 to be closed via the toggle linkage 65. Once this has occurred, the pressure sensor 55 detects, without the need to establish a separate connection to the gripper element 26, that the clamping jaws 66 must be closed because pressure is being supplied to the lines 52, 63. When thereafter the pressure is relieved by closing the switching valve 56, the clamping jaws 66 will open again, preferably automatically by the action of a helical spring 67 provided in the piston/cylinder unit 64, or the like.

Figure 3:
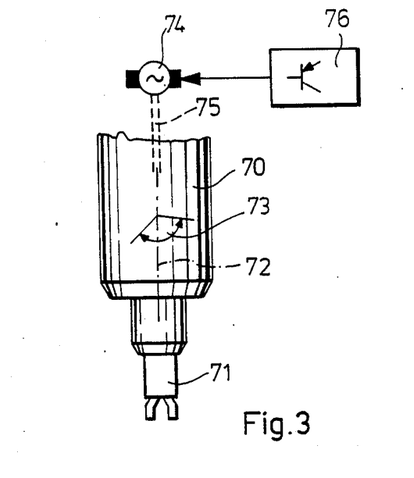
FIG. 3 is a very diagrammatic representation of a spindle stock with rotatable gripper arm.

FIG. 3 shows a very diagrammatic representation of a spindle stock 70 with a gripper element 71 mounted in its tool carrier in the manner described above. For rotating the gripper element 71 about a vertical axis 72 of the spindle stock 70, by a defined angular step 73 of, say 90°, 180°, or the like, a spindle motor 74 connected with the gripper element 71 via an operating connection 75, consisting usually of the tool carrier of the spindle, is caused to rotate correspondingly by means of a suitable stepping control 76. This can be achieved in a particularly simple manner when the spindle motor 74 is designed as a stepping motor and the stepping control 76 emits a defined number of pulses which cause the spindle motor 74 to rotate by a defined angular step so that the gripper element 71 performs the desired angular rotation 73. The same applies of course by analogy when the gripper element 71 is provided with a separate rotary drive which is then actuated directly by the stepping control 76 and which may derive its actuating force and its control signals for example in the same manner as described for the clamping jaws 76 in FIG. 2 with their compressed-air connection lines.

Figure 4:
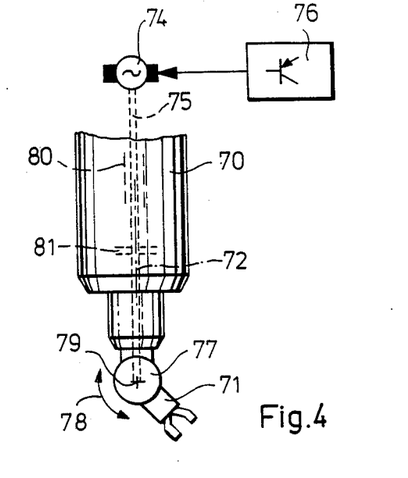
FIG. 4 shows a representation similar to FIG. 3 of a variant of the embodiment shown in FIG. 4.

FIG. 4 shows a variant of the embodiment shown in FIG. 3, where a miter gear 77 is arranged on the gripper element 71 to permit the gripper element 71 to be rotated by an angular step 78 relative to a transverse axis 79 extending perpendicularly to the vertical axis 72.

There are different possibilities of performing this rotary movement. On the one hand, the rotary movement of the spindle motor 74 can be transferred to the gripper element 71 directly by the miter gear 77. On the other hand, however, there may be provided a radial coupling 80 and an axial coupling 81 by means of which the gripper element 71 can be rotated by the spindle motor 74 alternatively about the vertical axis 72 (in the disengaged position of the axial coupling 81) or about the transverse axis 79 (in the disengaged position of the radial coupling 80). However, it is of course also possible in this case to provide the gripper element 71 with a separate corresponding rotary drive and the relevant control.

Figure 5:
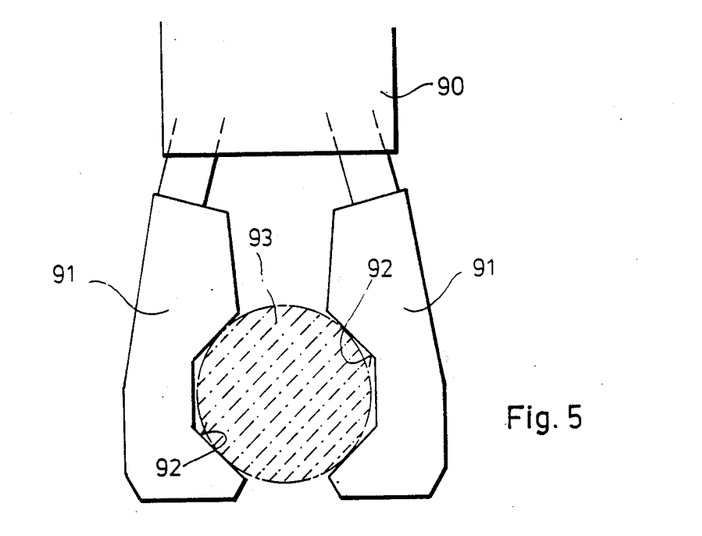
FIG. 5 is a greatly enlarged representation of the clamping jaws of a gripper element according to the invention, for form-locking engagement of the workpiece.

FIG. 5 shows a very enlarged section of a gripper element 90 with clamping jaws 91 which are provided on their inside with a pre-determined profile 92. In the case shown in FIG. 5, the profile 92 has the shape of a regular polygon. This permits workpieces 93 exhibiting a circular cross-section to be gripped not only by frictional, but also by form-locking engagement. The holding force of the gripping element 90 is not limited in this case by the actuating force of the clamping jaws 91, but rather by the holding force of the spindle in which the gripper element 90 is mounted.

Figure 6:
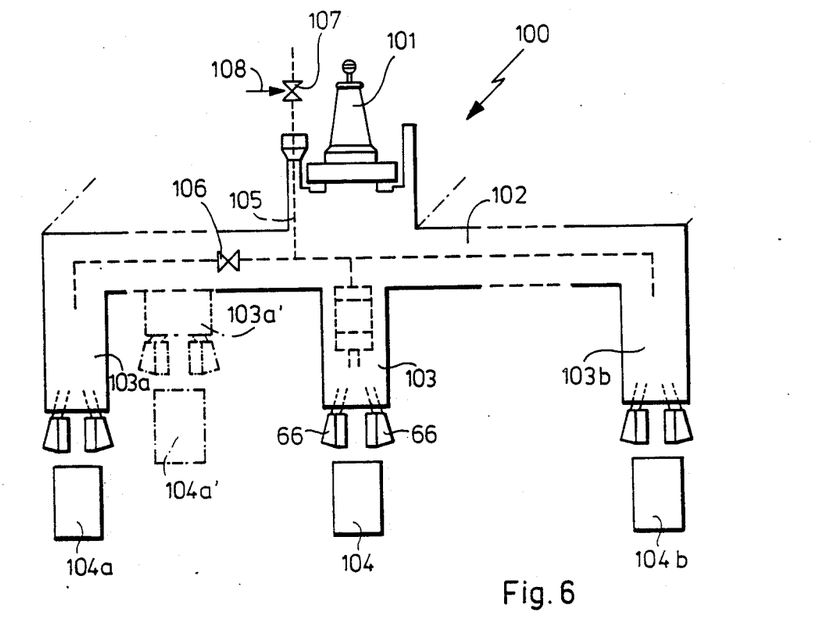
FIG. 6 shows a multiple gripper tool.

FIG. 6 shows a diagrammatic representation of a multiple gripper tool 100 provided with a single usual outer taper 101 and corresponding connection means for being clamped in the tool carrier of a spindle in the manner described already in connection with FIG. 2 for a single gripper element.

Figure 7:
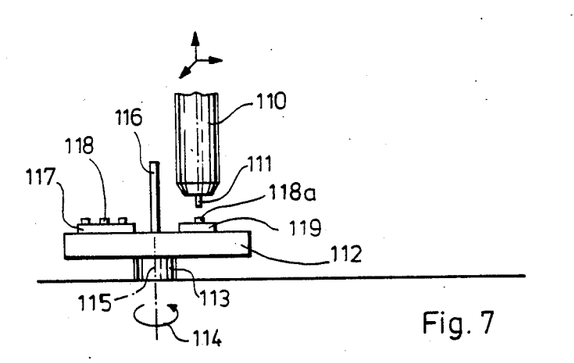
FIG. 7 is a very diagrammatic representation, in reduced scale, of a spindle stock with a work table designed as rotary table.

However, contrary to the embodiment shown in FIG. 2, the multiple gripper tool 100 shown in FIG. 6 comprises a frame 102 carrying on its lower face several gripper elements 103, 103a, 103b arranged in a line. The gripper elements may also be provided in two-dimensional arrangement, as indicated in FIG. 7 at 103a' by the dash-dotted line. The gripper elements 103, 103a, 103a', 103b, whose number is not limited by the example shown in FIG. 6, grip at the same time several workpieces 104, 104a, 104a', 104b for handling them in the manner described before. For operating the clamping jaws 66 of the different gripper elements 103, 103a, 103a', 103b, there may be provided a common channel 105 in which case the gripper elements are actuated simultaneously and in the same direction. It is, however, also possible to provide valves 106 in the channel 105 to permit certain ones of the clamping jaws 66 or individual gripper elements to be actuated differently in a defined manner. This applies also to the rotary drives that have been described above in connection with FIGS. 3 and 4 and which may be provided for the individual gripper elements 103, 103a, 103', 103b in identical or different design.

Finally, FIG. 6 shows in diagrammatic representation a metering valve 107 which is arranged within the power supply line for the clamping jaws 66 and which can be adjusted, preferably infinitely, by means of a control line 108. This permits the actuating force of the clamping jaws 66 to be adjusted in a sensitive manner via the control line 108 so that in each case the suitable clamping force can be exerted, depending on whether light-weight or heavy workpieces or such with raw or finely machined surfaces are to be handled.

Finally, FIG. 7 shows a configuration of a machine tool in which a spindle stock 110, with a tool or gripper element 111 mounted therein, is arranged beside a work table designed as a rotary table 112. The rotary table 112 rests on a vertical shaft 113 by which it can be rotated alternately by an angle 114 of, preferably, 180° about a vertical axis 115 extending in parallel to the spindle axis.

Preferably, a splash wall 116 is arranged at the center of the rotary table 112 in order to separate the left half—as viewed in FIG. 7—of the rotary table 112, i.e. the socalled equipment side, from the right half of the rotary table 112, the so-called processing side.

In the representation of FIG. 7, one can see a work magazine 117 with workpieces 118 on the equipment side, while on the processing side one can see clamping means for a dividing attachment 119 with a single workpiece 118a clamped therein.

The operation of the arrangement shown in FIG. 7 is as follows:

In the phase represented in FIG. 7, the workpiece 118a is at first machined completely with the tool 111. Then, a gripper element of the type described above is changed in, while the workpiece 118a is removed from the dividing attachment 119. The rotary table 112 is rotated by 180°, and the workpiece 118a is loaded into a vacant position of the work magazine 117. Then the gripper element picks up from the work magazine 117 a new workpiece which is still to be machined. The rotary table 112 then returns to the position shown in FIG. 7, by rotating about 180°, and the gripper element positions the workpiece that has to be machined in the dividing attachment 119 where it can be machined after a suitable tool has been changed in. The splash wall 116 serves to protect the work magazine 117 on the equipment side from splashing drilling coolant or chips flying around.

We claim:

1. A machine tool comprising:
   (a) A spindle stock having spindle means for receiving either a toolholder, or a gripping element, said spindle having drive means for rotation about predetermined angles about a rotating axis;
   (b) a working table disposed proximate said spindle stock, said working table being subdivided into a working area and a mounting area;
   (c) means for displacing said spindle stock along three coordinate directions relative to said working table;
   (d) a first toolholder magazine attached fixedly to said spindle stock for joint displacement therewith and being provided with a predetermined number of said toolholders having standard coupling means for being inserted into and clamped in said spindle, said toolholder magazine further having conveying means for transporting said toolholders into transfer positions on two sides of said spindle stock;
   (e) a gripping element having first jaw means for grasping workpieces, said gripping element comprising said standard coupling means and first coupling means for cooperating with second coupling means, disposed in said spindle, for feeding energy from said spindle to said gripping element for actuating said first jaw means;
   (f) two gripper arm means, disposed on either side of said spindle stock for alternately transferring said toolholders or said gripping element from one of several transfer positions into said spindle and vice versa;
   (g) workpiece holding means fixed on said working area of said working table and having second jaw means for holding and rotating said workpieces for subsequent machining; and,
   (h) a workpiece magazine fixed on said mounting area of said working table at a distance from said workpiece holding means and having a predetermined number of storage cells means for receiving unmachined and machine workpieces.

2. The machine tool of claim 1 wherein said working table includes a surface extending perpendicular to the spindle stock rotating axis and further comprising means for rotating said working table by 180° to alternately move said working area and said mounting area into close proximity to said spindle stock.

3. The machine tool of claim 2, wherein said tool magazine is shaped as a horse-shoe and is arranged in a plane extending perpendicularly to said rotating axis and around the latter.

4. The machine tool according to claim 3, wherein said first and second coupling means connect a pressure fluid line provided in said spindle stock with a fluid-operated drive of said gripping element, when said gripping element is clamped in said spindle stock.

5. The machine tool of claim 4, wherein said pressure fluid line is arranged at a periphery of said spindle stock.

6. The machine tool of claim 4, wherein said pressure fluid-line is arranged along said rotating axis.

7. The machine tool of claim 4, wherein a pressure sensor is connected to said pressure fluid line.

8. The machine tool of claim 1, wherein orthogonal drive means are provided for further rotation of said first jaws about an axis perpendicular to said rotating axis.

9. The machine tool of claim 8, wherein said spindle stock is provided with clutch means to permit said rotation to be carried out selectively either about said rotary axis or about said axis extending perpendicularly thereto.

10. The machine tool of claim 1, wherein said gripping element is provided with clamping jaws having a profile adapted to said workpiece to be gripped.

11. The machine tool of claim 1, wherein an actuating force of said clamping jaws is adjustable.

12. The machine tool of claim 1, wherein said gripping element is provided with a plurality of clamping jaws, said clamping jaws being adapted to be actuated separately.

13. The machine tool of claim 1 further comprising control means for effecting the following operations:
   (aa) transfer of said gripping element from one of said transfer positions into said spindle by means of one of said gripper arm means with said first jaw means being open;
   (bb) rotation of said working table to move said workpiece magazine on said mounting area into close proximity of said spindle stock and displacement of said spindle stock to take said gripping element into a first position adjacent one of said unmachined workpieces in said workpiece magazine;
   (cc) closing of said first jaw means by feeding energy to said gripping element to grasp said unmachined workpiece, and remove same from said workpiece magazine;
   (dd) rotation of said work table by 180° to move said workpiece holding means on said working area into close proximity to said spindle stock and displacement of said spindle stock to take said gripping element into a second position adjacent said workpiece holding means and introducing said unmachined workpiece into said second jaws being open;
   (ee) closing of said second jaw means and opening of said first jaw means;
   (ff) transfer of said gripping element from said spindle means into one of said transfer positions by means of one of said gripper arm means while simultaneously transferring a first toolholder from another of said transfer positions into said spindle means by means of said other gripper arm, and means;
   (gg) actuating of said drive means for continuous rotation of said spindle and of said means for displacing said spindle for machining said unmachined workpiece by means of a tool comprised in said first toolholder.

14. The machine tool of claim 19 further comprising control means for effecting the following operations:
   (aa) transfer of said gripping element from one of said transfer positions into said spindle by means of one of said gripper arm means with said first jaw means being open;
   (bb) displacement of said spindle stock to take said gripping element into a first position adjacent one of said unmachined workpieces in said workpiece magazine;
   (cc) closing of said first jaw means by feeding energy to said gripping element to grasp said unmachined workpiece;
   (dd) displacement of said spindle stock to take said gripping element into a second position adjacent said workpiece holding means and introducing said unmachined workpiece into said second jaw means being open;
(ee) closing of said second jaw means and opening of said first jaw means;
(ff) transfer of said gripping element from said spindle into one of said transfer positions by means of one of said gripper arm means while simultaneously transferring a first toolholder from another said transfer positions into said spindle by means of said other gripper arm means;
(gg) actuating of said drive means for continuous rotation of said spindle and of said means for displacing said spindle for machining said unmachined workpiece by means of a tool comprised in said first toolholder;
(hh) removal of said first toolholder from said spindle and insertion of said gripping element thereinto;
(ii) grasping of said workpiece by said gripping element;
(kk) rotation of said workpiece about said predetermined angle;
(ll) transfer of said workpiece into said workpiece holding means;
(mm) rotation of said workpiece about a second axis, not parallel to said rotating axis by means of said workpiece holding means; and
(nn) removal of said gripping element from said spindle and insertion of a second toolholder thereinto for subsequent machining of said workpiece.

15. A machine tool comprising:
a spindle stock;
a work table that can be rotated about an axis extending parallel to the spindle stock axis in such a manner that when said work table is rotated by about 180°, one one-half of said work table is located in a working area of said spindle stock, and wherein one-half of said work table carries a workpiece magazine, while another half carries a processing station, said spindle stock being disposed for movement about several axes relative to the work table;
a tool magazine;
at least one gripper arm for transferring tools from one magazine position in the tool magazine into a working position in a tool carrier of the spindle stock, or vice versa, at least one of the tools being designed as a handling element and the working space of the spindle stock being provided with at least one work magazine for accommodating workpieces, said handling element having a gripper element with externally operated clamping jaws for gripping one or more workpieces contained in the work magazine and transferring them into a machining station designed for holding and/or positioning a workpiece for machining thereof by means of a tool, the tool carrier of the spindle stock comprising connection means for supplying energy to operate the clamping jaws.

* * * * *

UNITED STATES PATENT AND TRADEMARK OFFICE
CERTIFICATE OF CORRECTION

PATENT NO. : 4,716,647
DATED : January 5, 1988
INVENTOR(S) : Dr. Hans-Henning Winkler and Eugen Rutschle It is certified that error appears in the above-identified patent and that said Letters Patent is hereby corrected as shown below:

```
In Claim 14, line 1, delete "19" and insert
therefor --1--.
```

Signed and Sealed this

Twentieth Day of December, 1988

*Attest:*

DONALD J. QUIGG

*Attesting Officer*  *Commissioner of Patents and Trademarks*